US012620355B2

(12) United States Patent
Lee et al.

(10) Patent No.: US 12,620,355 B2
(45) Date of Patent: May 5, 2026

(54) PIXEL AND DISPLAY APPARATUS

(71) Applicant: Samsung Display Co., Ltd., Yongin-si (KR)

(72) Inventors: Jaewoo Lee, Yongin-si (KR); Taeho Kim, Yongin-si (KR); Sungeun Lee, Yongin-si (KR); Seungjun Lee, Yongin-si (KR); Sangmin Jeon, Yongin-si (KR)

(73) Assignee: Samsung Display Co., LTD., Gyeonggi-do (KR)

( * ) Notice: Subject to any disclaimer, the term of this patent is extended or adjusted under 35 U.S.C. 154(b) by 0 days.

(21) Appl. No.: 18/899,855

(22) Filed: Sep. 27, 2024

(65) Prior Publication Data

US 2025/0118257 A1 Apr. 10, 2025

(30) Foreign Application Priority Data

Oct. 4, 2023 (KR) ........................ 10-2023-0132076

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2310/08* (2013.01); *G09G 2320/0233* (2013.01)

(58) Field of Classification Search
CPC ............... G09G 3/3233; G09G 3/3266; G09G 2300/0426; G09G 2300/0819; G09G 2300/0852; G09G 2300/0861; G09G 2310/0251; G09G 2310/0262; G09G 2310/066; G09G 2310/08; G09G 2320/02; G09G 2320/0233; G09G 2320/0247; G09G 2330/028; G09G 2340/0435
See application file for complete search history.

(56) References Cited

U.S. PATENT DOCUMENTS 11,610,541 B1 * 3/2023 Kim .................... G09G 3/3233
11,676,535 B2 6/2023 Jeon et al.
2022/0028329 A1 1/2022 Kim et al.
2022/0301484 A1 9/2022 In et al.
(Continued)

FOREIGN PATENT DOCUMENTS

KR 10-2022-0148345 11/2022
KR 10-2023-0001027 1/2023
(Continued)

*Primary Examiner* — Stacy Khoo
(74) *Attorney, Agent, or Firm* — Harness, Dickey & Pierce, P.L.C.

(57) ABSTRACT

A pixel includes a first transistor to output a current supplied to a light-emitting device, a second transistor electrically connected between a gate of the first transistor and a first terminal of the first transistor, a third transistor electrically connected between the first voltage line and a second terminal of the first transistor, a fourth transistor electrically connected between the first terminal of the first transistor and the light-emitting device, and a fifth transistor configured to supply a bias voltage to the second terminal of the first transistor. A gate-on voltage may be supplied to a gate of the fifth transistor during a portion of a period during which a gate-off voltage may be supplied to a gate of the third transistor and a gate of the fourth transistor.

19 Claims, 18 Drawing Sheets

(56) References Cited

U.S. PATENT DOCUMENTS

| | | | |
|---|---|---|---|
| 2022/0352291 | A1 | 11/2022 | Park et al. |
| 2022/0392382 | A1 | 12/2022 | Park et al. |
| 2023/0108865 | A1 | 4/2023 | Kim et al. |
| 2023/0267882 | A1 | 8/2023 | Yang |
| 2023/0298525 | A1 | 9/2023 | Kang et al. |
| 2023/0306906 | A1 | 9/2023 | Yang et al. |
| 2024/0005867 | A1 | 1/2024 | Lee et al. |
| 2024/0153463 | A1 | 5/2024 | Lee et al. |

FOREIGN PATENT DOCUMENTS

| | | |
|---|---|---|
| KR | 10-2023-0047282 | 4/2023 |
| KR | 10-2024-0065613 | 5/2024 |

* cited by examiner

PIXEL AND DISPLAY APPARATUS

CROSS-REFERENCE TO RELATED APPLICATIONS

This application claims priority under 35 U.S.C. § 119 from Korean Patent Application No. 10-2023-0132076 filed on Oct. 4, 2023 in the Korean Intellectual Property Office, the entire contents of which are incorporated herein by reference.

BACKGROUND

1. Technical Field

One or more embodiments relate to a pixel and a display apparatus including the same.

2. Description of the Related Art

Applications of display apparatuses have recently diversified. Moreover, since display apparatuses have become thinner and lighter, their range of use has increased.

Given that display apparatuses may be utilized in various ways, various methods may be used to design the shapes of display apparatuses, and functions that may be electrically connected or linked to display apparatuses are increasing.

SUMMARY

One or more embodiments include a display apparatus having an improved display quality. However, aspects of embodiments may not be limited thereto, and the above characteristics do not limit the scope of embodiments according to the disclosure.

Additional aspects will be set forth in portion in the description which follows and, in part, will be apparent from the description, or may be learned by practice of the presented embodiments of the disclosure.

According to one or more embodiments, a pixel may include a light-emitting device, a first transistor electrically connected between a first voltage line and the light-emitting device and configured to control a current supplied to the light-emitting device, a second transistor electrically between a first node electrically connected to a gate of the first transistor and a second node electrically connected to a first terminal of the first transistor, a third transistor electrically connected between the first voltage line and a third node electrically connected to a second terminal of the first transistor, a fourth transistor electrically connected between the second node and the light-emitting device, and a fifth transistor configured to supply a bias voltage to the third node. A gate-on voltage of a first level may be supplied to a gate of the fifth transistor during at least a portion of a period during which a gate-off voltage of a second level may be supplied to a gate of the third transistor and a gate of the fourth transistor.

The gate-on voltage may be supplied to a gate of the second transistor while the gate-on voltage may be supplied to the gate of the fifth transistor.

A frame may include a first scan period during which a data signal may be supplied and light may be emitted with a brightness corresponding to the data signal, and a second scan period during which the data signal supplied during the first scan period may be maintained and light may be emitted with the brightness corresponding to the data signal. The fifth transistor may supply a first bias voltage to the third node in case that the gate-on voltage may be supplied to the gate of the fifth transistor during the first scan period, and may supply a second bias voltage to the third node in case that the gate-on voltage may be supplied to the gate of the fifth transistor during the second scan period.

The second bias voltage may be higher than the first bias voltage.

The first scan period may include a first period during which the gate-on voltage may be supplied to each of a gate of the second transistor and the gate of the fifth transistor within the period during which the gate-off voltage of the second level may be supplied to the gate of the third transistor and the gate of the fourth transistor. The second scan period may include a second period during which the gate-off voltage may be supplied to the gate of the second transistor and the gate-on voltage may be supplied to the gate of the fifth transistor within the period during which the gate-off voltage of the second level may be supplied to the gate of the third transistor and the gate of the fourth transistor.

The gate of the third transistor and the gate of the fourth transistor may be electrically connected to a first gate line, and the gate of the fifth transistor may be electrically connected to a second gate line.

The pixel may further include a sixth transistor electrically connected between a pixel electrode of the light-emitting device and a second voltage line, and a gate of the sixth transistor may be electrically connected to the second gate line.

The pixel may further include a first capacitor electrically connected between the first voltage line and a fourth node, a second capacitor electrically connected between the fourth node and the first node, a seventh transistor electrically connected between a data line and the fourth node, an eighth transistor electrically connected between the fourth node and a third voltage line, and a ninth transistor electrically connected between the first node and a fourth voltage line.

The fifth transistor may be electrically connected between the third node and the third voltage line.

The gate of the seventh transistor may be electrically connected to a third gate line, the gate of the second transistor and a gate of the eighth transistor may be electrically connected to a fourth gate line, and a gate of the ninth transistor may be electrically connected to a fifth gate line.

According to one or more embodiments, a display apparatus may include a plurality of pixels, each of the plurality of pixels may include a light-emitting device, a first transistor electrically connected between a first voltage line and the light-emitting device and configured to control a current supplied to the light-emitting device, a second transistor electrically connected between a first node electrically connected to a gate of the first transistor and a second node electrically connected to a first terminal of the first transistor, a third transistor electrically connected between the first voltage line and a third node electrically connected to a second terminal of the first transistor, a fourth transistor electrically connected between the second node and the light-emitting device, and a fifth transistor configured to supply a bias voltage to the third node. A gate of the third transistor and a gate of the fourth transistor may be electrically connected to a first gate line that supplies a first gate signal, and a gate of the fifth transistor may be electrically connected to a second gate line that supplies a second gate signal.

Each of the plurality of pixels may further include a first capacitor electrically connected between the first voltage line and a fourth node, a second capacitor electrically connected between the fourth node and the first node, a sixth transistor electrically connected between a data line and the fourth node, a seventh transistor electrically connected between the fourth node and a second voltage line, an eighth transistor electrically connected between the first node and a third voltage line, and a ninth transistor electrically connected between a pixel electrode of the light-emitting device and a fourth voltage line.

The fifth transistor may be electrically connected between the third node and the second voltage line.

A gate of the ninth transistor may be electrically connected to the second gate line, a gate of the second transistor and a gate of the seventh transistor may be electrically connected to a third gate line that supplies a third gate signal, a gate of the sixth transistor may be electrically connected to a fourth gate line that supplies a fourth gate signal, and a gate of the eighth transistor may be electrically connected to a fifth gate line that supplies a fifth gate signal.

A frame may include a first scan period during which a data signal may be received and light may be emitted with a brightness corresponding to the data signal, and a first bias voltage may be supplied to the second voltage line during the first scan period.

A frame may further include at least one second scan period subsequent to the first scan period, wherein, during the at least one second scan period, the data signal supplied during the first scan period may be maintained and light may be emitted with a brightness corresponding to the data signal, and a second bias voltage may be supplied to the second voltage line during the second scan period.

The second bias voltage may be higher than the first bias voltage.

The display apparatus may further include a gate driving circuit configured to supply a plurality of gate signals to the plurality of pixels, and the first scan period and the second scan period may include a non-emission period and an emission period, respectively. The gate driving circuit may supply a first gate signal of a gate-off voltage to the first gate line during a non-emission period of each of the first scan period and the second scan period, a second gate signal of a gate-on voltage to the second gate line and supply a third gate signal of a gate-on voltage to the third gate line, during a first period of the non-emission period of the first scan period, and a second gate signal of a gate-on voltage to the second gate line and supply the third gate signal of a gate-off voltage to the third gate line, during a second period of the non-emission period of the second scan period.

The gate driving circuit may supply a fourth gate signal of a gate-on voltage to the fourth gate line during a write period between the first period of the first scan period and the emission period of the first scan period.

The gate driving circuit may supply a fifth gate signal of a gate-on voltage to the fifth gate line prior to the first period of the non-emission period of the first scan period.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION OF THE EMBODIMENTS

Figure 1A:
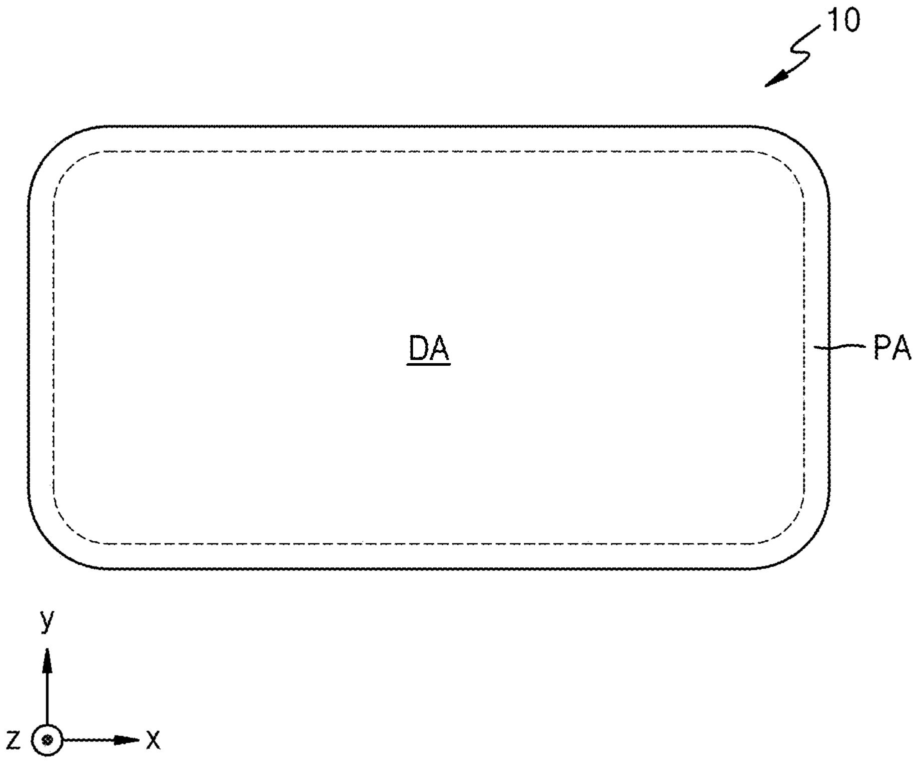
FIGS. 1A and 1B are schematic views of a display apparatus according to an embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals and/or reference characters denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the x direction, the y direction, and the z direction are not limited to directions corresponding to three axes of a rectangular coordinate system, and may be interpreted in a broader sense. For example, the x direction, the y direction, and the z direction may be perpendicular to one another, or may represent different directions that are not perpendicular to one another.

For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

A display apparatus according to embodiments displays a video or a still image, and thus may be used as the display screens of various products such as not only portable electronic apparatuses, such as mobile phones, smartphones, tablet personal computers (PCs), mobile communication terminals, electronic notebooks, electronic books, portable multimedia players (PMPs), navigation devices, and ultra mobile PCs (UMPCs) but also televisions, notebooks, monitors, advertisement panels, and Internet of things (IoT) devices. The display apparatus according to an embodiment may also be used in wearable devices such as smart watches, watch phones, glasses-type displays, and head mounted displays (HMDs). The display apparatus according to an embodiment may also be used as dashboards of automobiles, center information displays (CIDs) of the center fasciae or dashboards of automobiles, room mirror displays that replace the side mirrors of automobiles, and displays arranged on the rear sides of front seats to serve as entertainment devices for back seat passengers of automobiles. The display apparatus may be flexible.

Figure 1B:
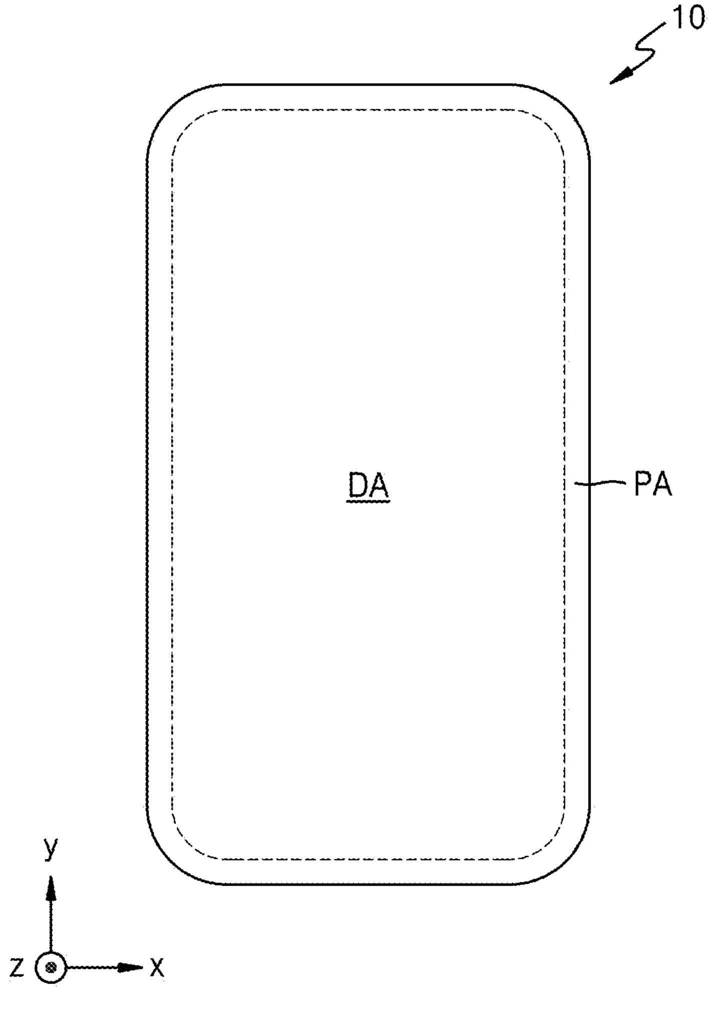
Figure 2:
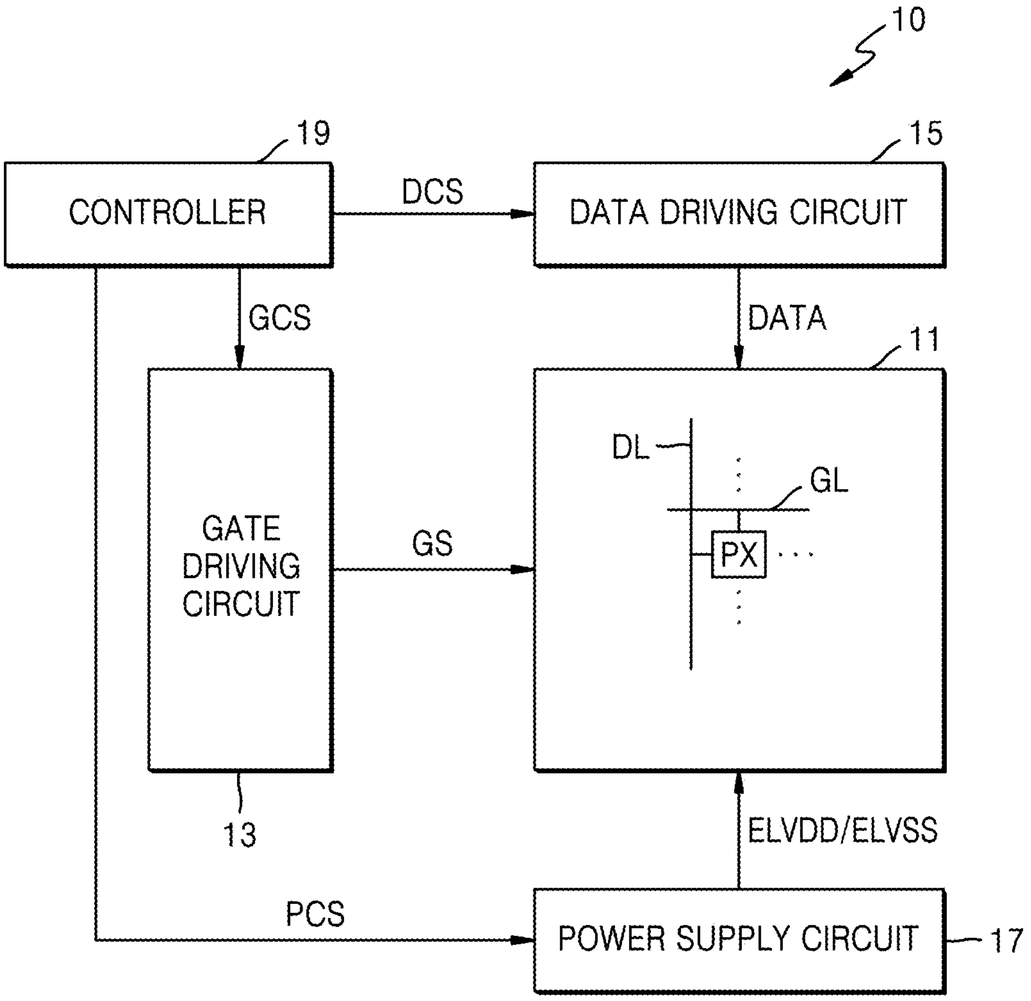
FIG. 2 is a schematic block diagram of a display apparatus according to an embodiment.
Figure 3A:
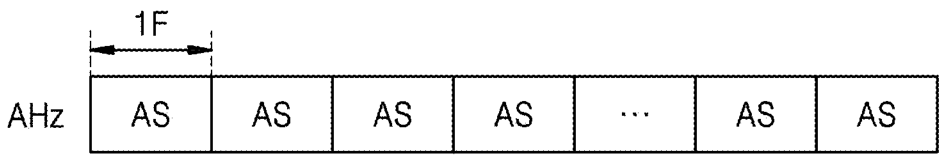
FIGS. 3A and 3B are diagrams for explaining a method of driving a display apparatus according to a driving frequency.
Figure 3B:
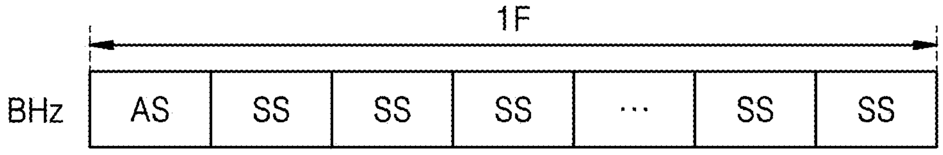

FIGS. 1A and 1B are schematic views of a display apparatus 10 according to an embodiment. FIG. 2 is a schematic block diagram of the display apparatus 10 according to an embodiment. FIGS. 3A and 3B are diagrams for explaining a method of driving a display apparatus according to a driving frequency.

Referring to FIGS. 1A and 1B, the display apparatus 10 may include a display area DA displaying an image, and a peripheral area PA around the display area DA. The display area DA may be entirely surrounded by the peripheral area PA.

When viewing the display area DA in a plan view, the display area DA may have a rectangular shape. According to an embodiment, the display area DA may have a polygonal shape (e.g., a triangular shape, a pentagonal shape, or a hexagonal shape), a circular shape, an elliptical shape, an irregular shape, or the like. The display area DA may have a shape with rounded edge corners. According to an embodiment, the display apparatus 10 may have a display area DA having a shape in which a length in the x direction may be greater than a length in the y direction, as shown in FIG. 1A. According to an embodiment, the display apparatus 10 may have a display area DA having a shape in which a length in the y direction may be greater than a length in the x direction, as shown in FIG. 1B. The z direction may be perpendicular to a plane defined by the x direction and the y direction.

Referring to FIG. 2, the display apparatus 10 according to an embodiment may include a pixel area 11, a gate driving circuit 13, a data driving circuit 15, a power supply circuit 17, and a controller 19.

The pixel area 11 may be included in the display area DA. Various conductive lines for transmitting electric signals to be applied to the display area DA, external circuits electrically connected to pixel circuits, and pads to which a printed circuit board (PCB) or a driver integrated circuit (IC) chip may be attached may be located in the peripheral area PA. For example, the gate driving circuit 13, the data driving circuit 15, the power supply circuit 17, and the controller 19 may be included in the peripheral area PA.

As shown in FIG. 2, multiple gate lines GL, multiple data lines DL, and multiple pixels PX electrically connected thereto may be disposed in the display area DA. The pixels PX may be arranged in any of various configurations, such as a stripe configuration, a PenTile® configuration, a diamond configuration, and a mosaic configuration, to display an image. Each of the pixels PX may include an organic light-emitting diode OLED as a display element (light-emitting device), and the organic light-emitting diode OLED may be electrically connected to a pixel circuit. The pixel circuit may include multiple transistors and at least one capacitor. Each of the pixels PX may emit, for example, red light, green light, blue light, or white light, via the organic light-emitting diode OLED. Each of the pixels PX may be electrically connected to at least one corresponding gate line among the gate lines GL and a corresponding data line among the data lines DL.

Each of the gate lines GL may extend in the x direction (row direction) and may be electrically connected to pixels PX located in the same row. Each of the gate lines GL may transfer a gate signal to the pixels PX in the same row. Each of the data lines DL may extend in the y direction (column direction) and may be electrically connected to pixels PX located in the same column. Each of the data lines DL may transfer data signals to the pixels PX in the same column in synchronization with the gate signal.

According to an embodiment, the peripheral area PA may be a non-display area in which no pixels PX may be disposed. According to an embodiment, multiple pixels PX may be arranged in a portion of the peripheral area PA. For example, the pixels PX may be arranged at at least one corner of the peripheral area PA and may overlap the gate driving circuit 13. Accordingly, a dead area may be reduced, and the display area DA may expand.

The gate driving circuit 13 may be electrically connected to the gate lines GL, may generate gate signals GS according to a control signal GCS from the controller 19, and may sequentially supply the gate signals to the gate lines GL. The gate line GL may be electrically connected to a gate of a transistor included in a pixel PX. The gate signal may be a gate control signal for controlling turn-on and turn-off operations of a transistor whose gate may be electrically connected to a gate line GL. The gate signal may be a signal including a gate on-voltage for turning on a transistor and a gate off-voltage for turning off the transistor.

Although a pixel PX may be illustrated as being electrically connected to a gate line GL in FIG. 2, this may be exemplary, and the pixel PX may be electrically connected to two or more gate lines, and the gate driving circuit 13 may supply two or more gate signals of which on-voltages may be applied at different timings to gate lines corresponding to the two or more gate signals.

The data driving circuit 15 may be electrically connected to the data lines DL and may supply data signals to the data lines DL according to a control signal DCS from the controller 19. The data signal supplied to the data line DL may be supplied to the pixel PX to which the gate signal has been supplied. The data driving circuit 15 may convert input image data input from the controller 19 and having a gray level into a data signal DATA in the form of voltage or current.

The power supply circuit 17 may generate voltages desirable for driving the pixels PX in response to the control signal PCS from the controller 19. The power supply circuit 17 may generate a first driving voltage ELVDD and a second driving voltage ELVSS and supply them to the pixels PX. The first driving voltage ELVDD may be a high-level voltage that may be provided to a terminal of a driving transistor electrically connected to a first electrode (i.e., a pixel electrode or an anode) of a display element included in the pixel PX. The second driving voltage ELVSS may be a low-level voltage that may be provided to a second electrode (i.e., an opposite electrode or a cathode) of the display element included in the pixel PX.

The controller 19 may generate control signals GCS, DCS, and PCS, based on signals input from the outside, and may supply them to the gate driving circuit 13, the data driving circuit 15, and the power supply circuit 17, respectively. The control signal GCS output to the gate driving circuit 13 may include multiple clock signals and a gate start signal. The control signal DCS output to the data driving circuit 15 may include a data start signal and clock signals.

The display apparatus 10 may include a display panel, and the display panel may include a substrate. The pixels PX may be disposed in the display area DA of the substrate. A portion or the entirety of the gate driving circuit 13 may be formed (e.g., directly formed) in the peripheral area PA of the substrate during a process of forming transistors constituting the pixel circuit in the display area DA of the substrate. The data driving circuit 15, the power supply circuit 17, and the controller 19 may be formed as separate IC chips, respectively, or may be formed as a single IC chip, and may be disposed on a flexible printed circuit board (FPCB) electrically connected to a pad disposed on a side of the substrate. According to an embodiment, the data driving circuit 15, the power supply circuit 17, and the controller 19 may be disposed (e.g., directly disposed) on the substrate by using a chip on glass (COG) or chip on plastic (COP) method.

The display apparatus 10 may support a variable refresh rate (VRR). A refresh rate may be a frequency at which a data signal may be actually written to the driving transistor of the pixel PX, and may be also referred to as a screen refresh rate or a screen reproduction rate, and may represent the number of image frames reproduced for a second. According to an embodiment, the refresh rate may be the output frequency of the gate driving circuit 13 and/or the data driving circuit 15. A frequency corresponding to the refresh rate may be a driving frequency. The display apparatus 10 may adjust the output frequency of the gate driving circuit 13 and the output frequency of the data driving circuit 15 corresponding thereto, according to the driving frequency.

The display apparatus 10 supporting a VRR may operate by changing the driving frequency within the range of a maximum driving frequency to a minimum driving frequency. For example, in case that the refresh rate is about 60 Hz, a gate signal for writing a data signal from the gate driving circuit 13 may be supplied to each horizontal line (row) 60 times per second. The display apparatus 10 may display an image while changing the driving frequency according to the refresh rate.

According to the driving frequency, a frame 1F may include a first scan period AS, or may include the first scan period AS and one or more second scan periods SS. For example, as shown in FIG. 3A, in the display apparatus 10 operating at a driving frequency of AHz, a frame 1F may include a first scan period AS. As shown in FIG. 3B, in the display apparatus 10 operating at a driving frequency of BHz lower than the driving frequency of AHz, a frame 1F may include a first scan period AS and one or more second scan periods SS. As the driving frequency decreases, a length of time of a frame 1F may increase. According to an embodiment, AHz in FIG. 3A may be a driving frequency of about 240 Hz, and BHz in FIG. 3B may be a driving frequency lower than about 240 Hz, such as about 10 Hz.

The first scan period AS may be defined as an address scan period during which a data signal may be written to the pixel PX and the pixel PX may emit light with a brightness corresponding to the written data signal. An operation of writing a data signal from the data line DL to the pixel PX may also be referred to as a data programming operation. The second scan period SS may be defined as a self scan period during which no data signals may be written to the pixel PX. During the second scan period SS, the data signal written during the first scan period AS may be maintained, and the pixel PX may emit light with the brightness corresponding to the data signal written during the first scan period AS. A length of the second scan period SS may be equal to that of the first scan period AS.

Figure 4:
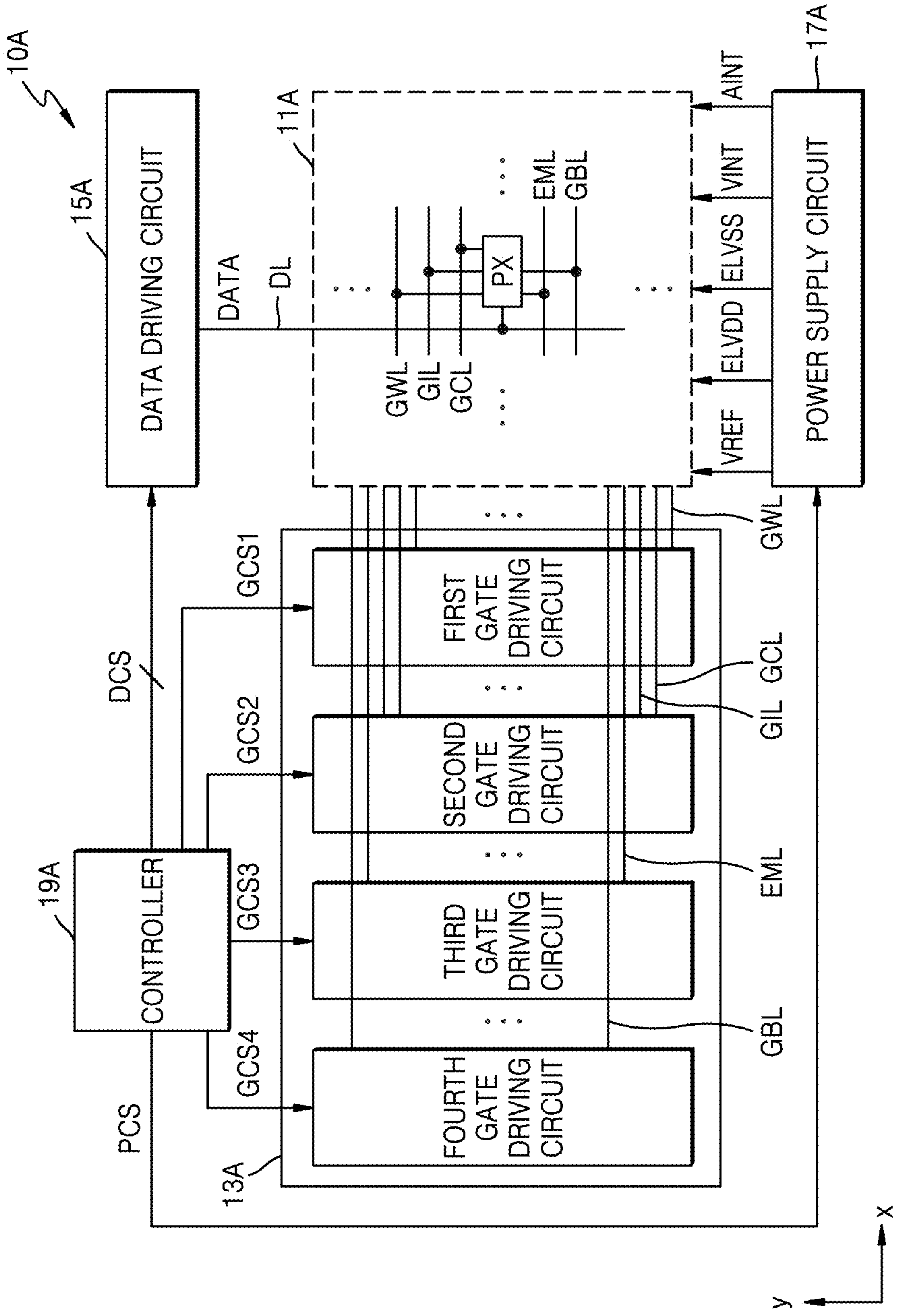
FIG. 4 is a schematic diagram of a display apparatus according to an embodiment.
Figure 5:
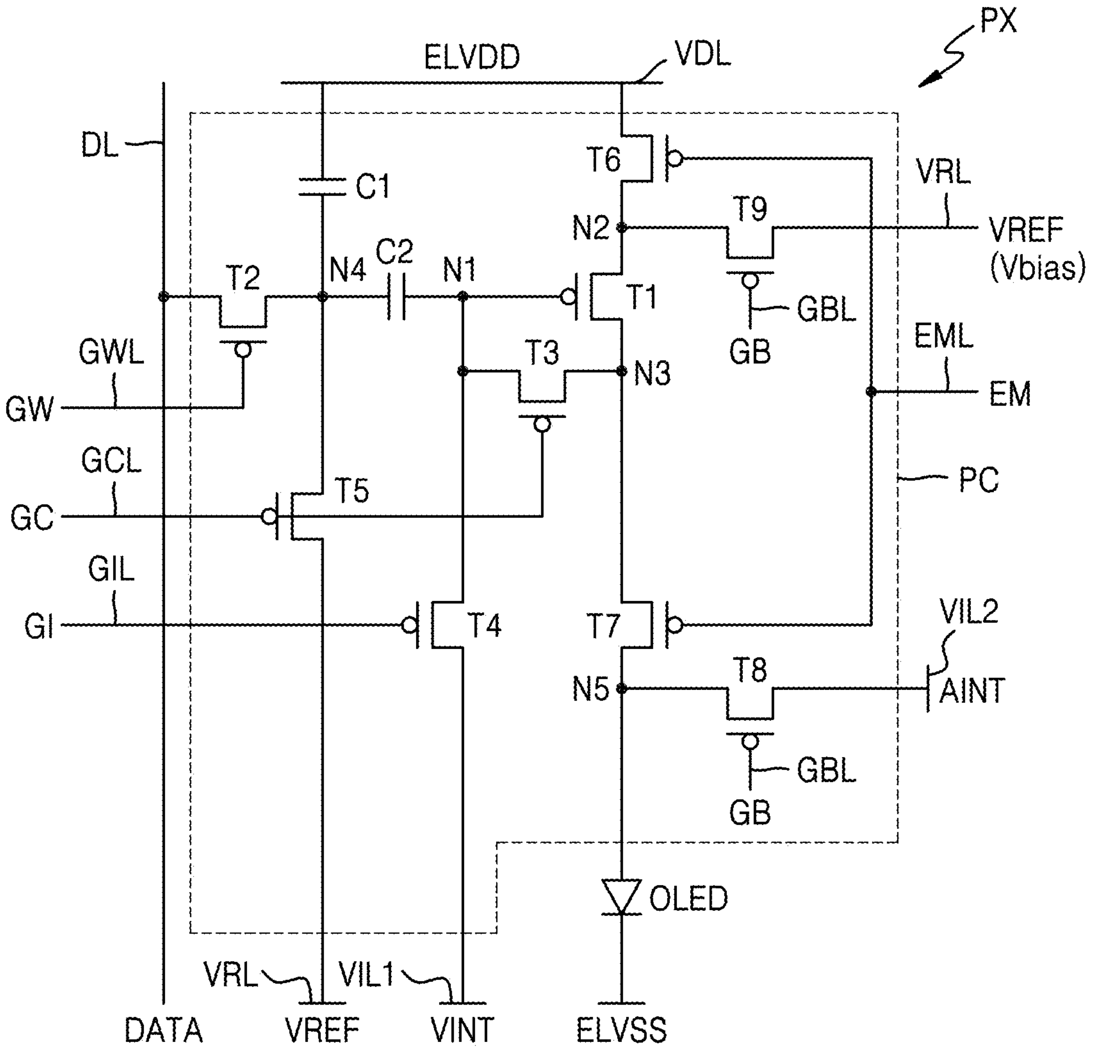
FIG. 5 is a schematic diagram of an equivalent circuit of a pixel of FIG. 4.

FIG. 4 is a schematic diagram of a display apparatus 10A according to an embodiment. FIG. 5 is a schematic diagram of an equivalent circuit of the pixel PX of FIG. 4.

Referring to FIG. 4, the display apparatus 10A may include a pixel area 11A, a gate driving circuit 13A, a data driving circuit 15A, a power supply circuit 17A, and a controller 19A. The display apparatus 10A may support a variable refresh rate (VRR). The display apparatus 10A may be an embodiment of the display apparatus 10 shown in FIG. 2. The same configuration and the same descriptions as those of the display apparatus 10 shown in FIG. 2 will now be omitted.

The pixel area 11A may include multiple pixels PX. Each of the pixels PX may be electrically connected to a first gate line GWL that transmits a first gate signal GW, a second gate line GIL that transmits a second gate signal GI, a third gate line GCL that transmits a third gate signal GC, a fourth gate line EML that transmits a fourth gate signal EM, a fifth gate line GBL that transmits a fifth gate signal GB, and a data line DL that transmits a data signal DATA. Because light emission of the pixel PX may be controlled by the fourth gate signal EM, the fourth gate signal EM may be referred to as an emission control signal, and the fourth gate line EML may be referred to as an emission control line.

The pixel PX may receive a first driving voltage ELVDD (or a first voltage), a second driving voltage ELVSS (or a second voltage), a reference voltage VREF (or a third voltage), a first initializing voltage VINT (or a fourth voltage), and a second initializing voltage AINT (or a fifth voltage). According to an embodiment, the pixel PX may receive the reference voltage VREF as a bias voltage Vbias of FIG. 5.

The gate driving circuit 13A may be electrically connected to the first, second, third, fourth, and fifth gate lines GWL, GIL, GCL, EML, and GBL, and may sequentially supply the first, second, third, fourth, and fifth gate signals GW, GI, GC, EM, and GB to the first, second, third, fourth, and fifth gate lines GWL, GIL, GCL, EML, and GBL, respectively. The gate driving circuit 13A may include first through fourth gate driving circuits. Each of the first through fourth gate driving circuits may include multiple stages.

The first gate driving circuit may be electrically connected to multiple first gate lines GWL and may sequentially supply the first gate signal GW to the first gate lines GWL. The second gate driving circuit may be electrically connected to multiple second gate lines GIL and multiple third gate lines GCL, sequentially supply the second gate signal GI to the second gate lines GIL and sequentially supply the third gate signal GC to the third gate lines GCL. The third gate driving circuit may be electrically connected to multiple fourth gate lines EML and may sequentially supply the fourth gate signal EM to the fourth gate lines EML. The fourth gate driving circuit may be electrically connected to multiple fifth gate lines GBL and may sequentially supply the fifth gate signal GB to the fifth gate lines GBL.

According to an embodiment, the first, second, third, fourth, and fifth gate signals GW, GI, GC, EM, and GB may be supplied to the first, second, third, fourth, and fifth gate lines GWL, GIL, GCL, EML, and GBL in each pixel row at times (e.g., predetermined or selectable times), respectively. According to an embodiment, the first gate signal GW may be sequentially supplied to the first gate line GWL of each pixel row at times (e.g., predetermined or selectable times), and the second, third, fourth, and fifth gate signals GI, GC, EM, and GB may be simultaneously supplied to the second, third, fourth, and fifth gate lines GIL, GCL, EML, and GBL in two pixel rows, respectively, and may be sequentially supplied in units of two pixel rows. For example, the third gate driving circuit may simultaneously supply the fourth gate signal EM to the fourth gate line EML of each of two pixel rows, and may sequentially supply the fourth gate signal EM in units of two pixel rows.

The data driving circuit 15A may supply the data signal DATA to multiple data lines DL in response to a control signal DCS from the controller 19A.

According to an embodiment, output frequencies of the first gate driving circuit outputting the first gate signal GW and/or the data driving circuit 15A may be determined according to a driving frequency corresponding to a refresh rate.

The power supply circuit 17A may supply the first driving voltage ELVDD and the second driving voltage ELVSS to the pixels PX of the pixel area 11A. The power supply circuit 17A may generate the reference voltage VREF, the first initializing voltage VINT and the second initializing voltage AINT and supply them to the pixels PX.

The power supply circuit 17A may supply different reference voltages VREF to the pixels PX during the first scan period AS and the second scan period SS. According to an embodiment, the power supply circuit 17A may supply a first reference voltage VREF1 (sec FIG. 8) to the pixels PX during the first scan period AS, and may supply a second reference voltage VREF2 (see FIG. 8) to the pixels PX during the second scan period SS.

The controller 19A may generate control signals GCS1 through GCS 4, DCS, and PCS, based on signals input from an external source, and may supply them to the gate driving circuit 13A, the data driving circuit 15A, and the power supply circuit 17A, respectively. The controller 19A may supply the control signals GCS1 through GCS4 to the first through fourth gate driving circuits of the gate driving circuit 13A, respectively.

Referring to FIG. 5, the pixel PX may include a pixel circuit PC, and an organic light-emitting diode OLED as a display element electrically connected to the pixel circuit PC.

The pixel circuit PC of the pixel PX may include first, second, third, fourth, fifth, sixth, seventh, eighth, and ninth transistors T1, T2, T3, T4, T5, T6, T7, T8, and T9 and signal lines electrically connected thereto. The signal lines may include the data line DL, the first gate line GWL, the second gate line GIL, the third gate line GCL, the fourth gate line EML, the fifth gate line GBL, a driving voltage line VDL, a reference voltage line VRL, a first initializing voltage line VIL1, and a second initializing voltage line VIL2.

The first transistor T1 may be a driving transistor in which the magnitude of a source-drain current may be determined according to a gate-source voltage, and the second through ninth transistors T2 through T9 may be switching transistors that may be turned on/off according to the gate-source voltage, substantially, a gate voltage. The first through ninth transistors T1 through T9 may be implemented as thin-film transistors. According to the type (p-type or n-type) of transistor and/or operating conditions thereof, a first terminal of each of the first through ninth transistors T1 through T9 may be a source or a drain, and a second terminal thereof may be a different terminal than the first terminal. For example, in case that the first terminal may be a source, the second terminal may be a drain.

The first through ninth transistors T1 through T9 may be P-type silicon thin-film transistors. A gate-on voltage of a gate signal that turns on the first through ninth transistors T1 through T9 may be a low-level voltage (second level voltage), and a gate-off voltage of a gate signal that turns off the first through ninth transistors T1 through T9 may be a high-level voltage (first level voltage).

The first transistor T1 may be electrically connected between the driving voltage line VDL and the organic light-emitting diode OLED. The first transistor T1 may be electrically connected to the driving voltage line VDL through the sixth transistor T6, and may be electrically connected to the organic light-emitting diode OLED through the seventh transistor T7. The first transistor T1 may include a gate electrically connected to a first node N1, a first terminal electrically connected to a second node N2, and a second terminal electrically connected to a third node N3. The first transistor T1 may supply to the organic light-emitting diode OLED a driving current corresponding to a voltage applied to the first node N1 according to a switching operation of the second transistor T2.

The second transistor T2 may be electrically connected between the data line DL and a fourth node N4. The second transistor T2 may include a gate electrically connected to the first gate line GWL, a first terminal electrically connected to the data line DL, and a second terminal electrically connected to the fourth node N4. The second transistor T2 may be turned on in response to the first gate signal GW received through the first gate line GWL, and thus transmit the data signal DATA received through the data line DL to the fourth node N4.

The third transistor T3 may be electrically connected between the first node N1 and the third node N3. The third transistor T3 may be electrically connected to the organic light-emitting diode OLED via the seventh transistor T7. The third transistor T3 may include a gate electrically connected to the third gate line GCL, a first terminal electrically connected to the third node N3, and a second terminal electrically connected to the first node N1. The third transistor T3 may be turned on in response to the third gate signal GC received through the third gate line GCL, and thus the first transistor T1 may be diode-connected. In case that the first transistor T1 is diode-connected, a threshold voltage of the first transistor T1 may be compensated for.

The fourth transistor T4 may be electrically connected between the first node N1 and the first initializing voltage line VIL1. The fourth transistor T4 may include a gate electrically connected to the second gate line GIL, a first terminal electrically connected to the first node N1, and a second terminal electrically connected to the first initializing voltage line VIL1. The fourth transistor T4 may be turned on in response to the second gate signal GI received through the second gate line GIL and thus transmit the first initializing voltage VINT to the first node N1 to thereby initialize the first node N1, namely, the gate of the first transistor T1.

The fifth transistor T5 may be electrically connected between the fourth node N4 and the reference voltage line VRL. The fifth transistor T5 may include a gate electrically connected to the third gate line GCL, a first terminal electrically connected to the fourth node N4, and a second terminal electrically connected to the reference voltage line VRL. The gate of the fifth transistor T5 may be electrically connected to the gate of the third transistor T3. The fifth transistor T5 may be turned on in response to the third gate signal GC received through the third gate line GCL and thus transmit the reference voltage VREF to the fourth node N4 to thereby initialize the fourth node N4.

The sixth transistor T6 may be electrically connected between the driving voltage line VDL and the second node N2. The seventh transistor T7 may be electrically connected between the third node N3 and the organic light-emitting diode OLED. The sixth transistor T6 may include a gate electrically connected to the fourth gate line EML, a first terminal electrically connected to the driving voltage line VDL, and a second terminal electrically connected to the second node N2. The seventh transistor T7 may include a gate electrically connected to the fourth gate line EML, a first terminal electrically connected to the third node N3, and a second terminal electrically connected to a pixel electrode of the organic light-emitting diode OLED. In case that the sixth transistor T6 and the seventh transistor T7 may be simultaneously turned on according to the fourth gate signal EM received via the fourth gate line EML, the driving current may flow through the organic light-emitting diode OLED.

The eighth transistor T8 may be electrically connected between the organic light-emitting diode OLED and the second initializing voltage line VIL2. The eighth transistor T8 may include a gate electrically connected to the fifth gate line GBL, a first terminal electrically connected to the second terminal of the seventh transistor T7 and the pixel electrode of the organic light-emitting diode OLED at the fifth node N5, and a second terminal electrically connected to the second initializing voltage line VIL2. The eighth transistor T8 may be turned on in response to the fifth gate signal GB received via the fifth gate line GBL and thus transmit the second initializing voltage AINT to the pixel electrode of the organic light-emitting diode OLED to thereby initialize the pixel electrode of the organic light-emitting diode OLED.

The ninth transistor T9 may be electrically connected to the second node N2 and may supply the bias voltage Vbias to the first terminal of the first transistor T1. The ninth transistor T9 may include a gate electrically connected to the fifth gate line GBL, a first terminal that receives the bias voltage Vbias, and a second terminal electrically connected to the first terminal of the first transistor T1. The ninth transistor T9 may be turned on in response to the fifth gate signal GB received through the fifth gate line GBL, and thus transmit the bias voltage Vbias to the first terminal of the first transistor T1 to thereby control the gate-source voltage of the first transistor T1 to compensate for a change in current characteristics of the first transistor T1. According to an embodiment, the first terminal of the ninth transistor T9 may be electrically connected to the reference voltage line VRL, and the bias voltage Vbias may be the reference voltage VREF.

A first capacitor C1 may be electrically connected between the driving voltage line VDL and the fourth node N4. The first capacitor C1 may store a voltage corresponding to a voltage difference between the driving voltage line VDL and the fourth node N4.

A second capacitor C2 may be electrically connected between the first node N1 and the fourth node N4. The second capacitor C2 may store a voltage corresponding to a voltage difference between the first node N1 and the fourth node N4. The first capacitor C1 and the second capacitor C2 may store and maintain the data signal DATA written through the second transistor T2.

The organic light-emitting diode OLED may include the pixel electrode (e.g., an anode) and an opposite electrode (e.g., a cathode) facing the pixel electrode, and the opposite electrode may receive the second driving voltage ELVSS. The organic light-emitting diode OLED may receive the driving current corresponding to the data signal DATA from the first transistor T1 and emit light in a certain color, thereby displaying an image.

According to an embodiment, multiple transistors included in a pixel circuit may be P-type transistors. According to an embodiment, multiple transistors included in a pixel circuit may be N-type transistors, or some may be N-type transistors and others may be P-type transistors.

A transistor according to an embodiment may be an amorphous silicon thin-film transistor (amorphous-Si TFT), a low temperature polysilicon (LTPS) TFT, or an oxide TFT. The oxide TFT may include oxide such as amorphous Indium-Gallium-Zinc-Oxide (IGZO), Zinc-Oxide (ZnO), or Titanium Oxide (TiO), as a semiconductor layer (active layer).

Figure 6:
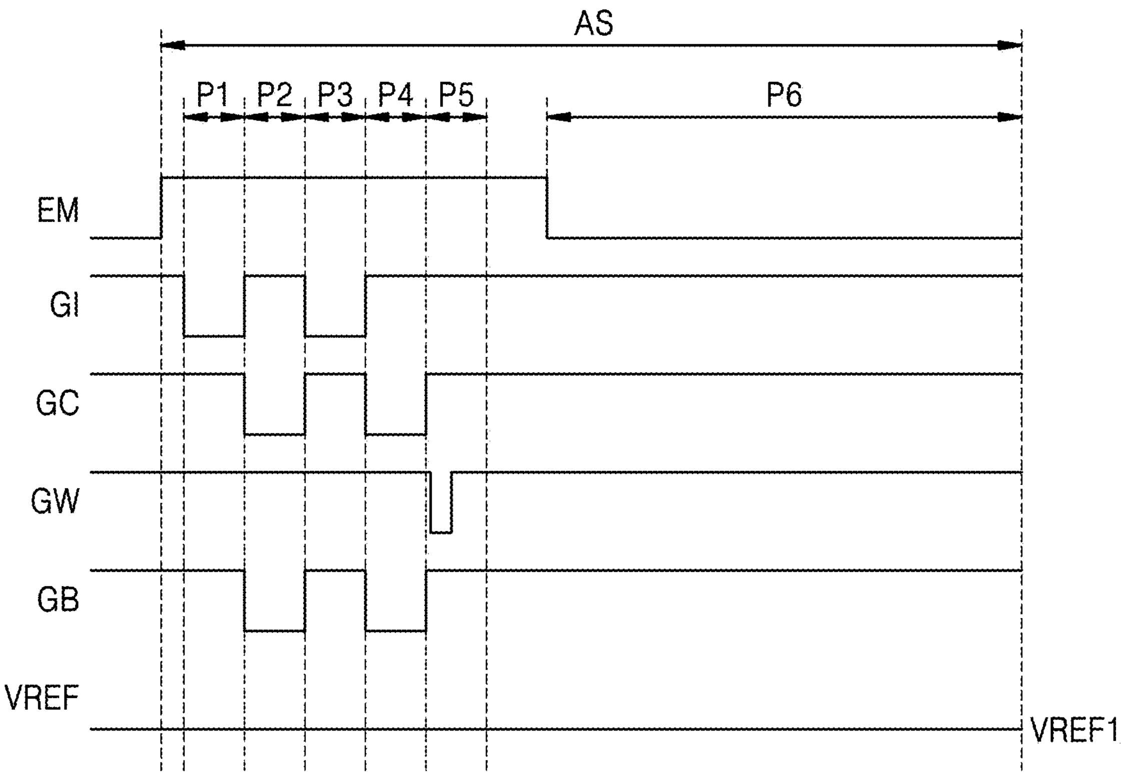
FIG. 6 is a timing diagram of signals supplied to the pixel of FIG. 4 during a first scan period.
Figure 7:
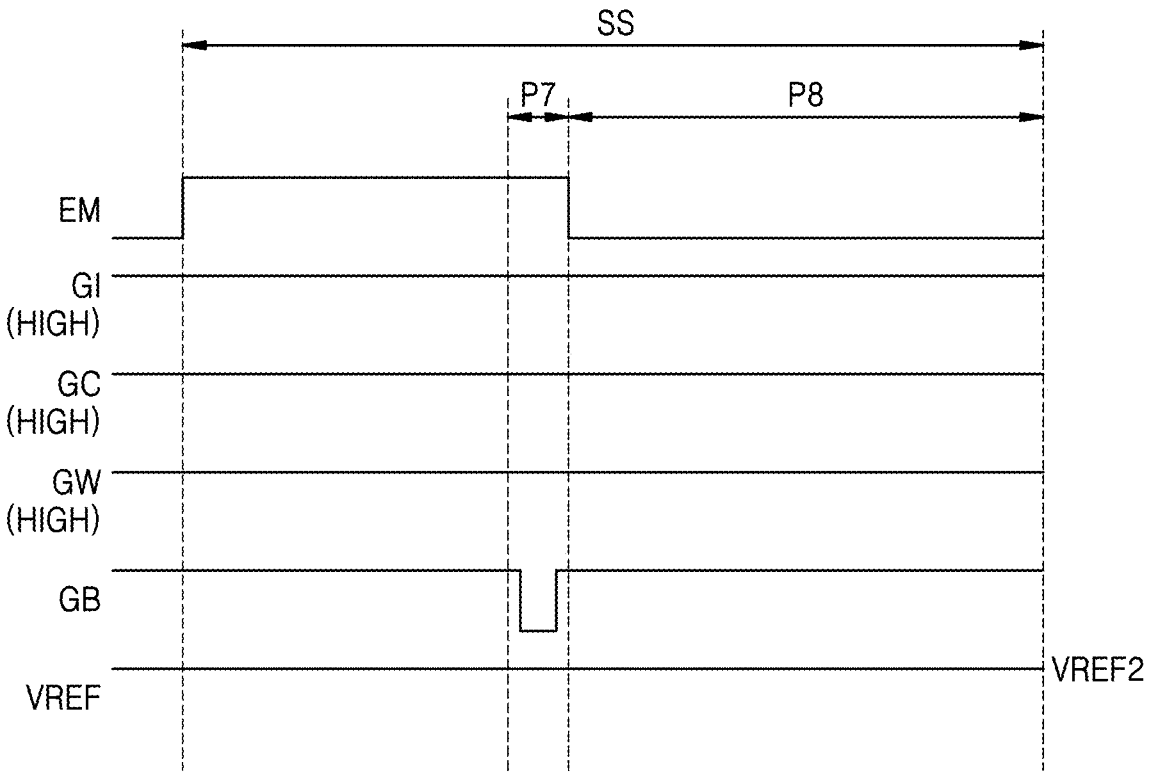
FIG. 7 is a timing diagram of signals supplied to the pixel of FIG. 4 during a second scan period.
Figure 8:
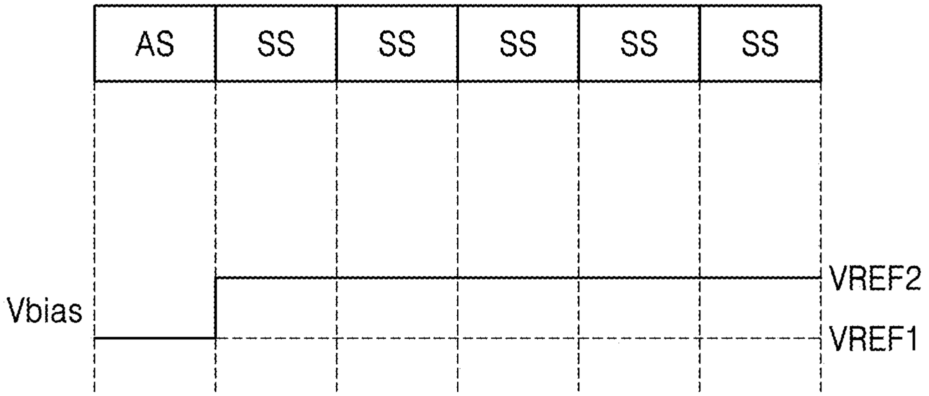
FIG. 8 is a timing diagram showing a bias voltage supplied to the pixel during a first scan period and a second scan period.

FIGS. 6 and 7 are timing diagrams for explaining an operation of a pixel according to an embodiment. FIG. 6 is a timing diagram of signals supplied to the pixel PX of FIG. 4 during a first scan period AS. FIG. 7 is a timing diagram of signals supplied to the pixel PX of FIG. 4 during a second scan period SS. FIG. 8 is a timing diagram showing a bias voltage supplied to the pixel PX during a first scan period and a second scan period.

During a first scan period AS and a second scan period SS, the gate driving circuit 13A may supply the first, second, third, fourth, and fifth gate signals GW, GI, GC, EM, and GB to the first, second, third, fourth, and fifth gate lines GWL, GIL, GCL, EML, and GBL, respectively. Start and end timings of a gate-on voltage maintenance period (a gate-on voltage duration) and a gate-off voltage maintenance period (a gate-off voltage duration) of the first, second, third, fourth, and fifth gate signals GW, GI, GC, EM, and GB may be the same or different, and some signals may overlap each other during some periods.

During the first scan period AS and the second scan period SS, the power supply circuit 17A may supply the first driving voltage ELVDD to the driving voltage line VDL, supply the reference voltage VREF to the reference voltage line VRL, supply the first initializing voltage VINT to the first initializing voltage line VIL1, and supply the second initializing voltage AINT to the second initializing voltage line VIL2.

A reference voltage VREF supplied by the power supply circuit 17A during the first scan period AS may be different from that supplied during the second scan period SS. The power supply circuit 17A may supply a first reference voltage VREF1 to the reference voltage line VRL during the first scan period AS, and may supply a second reference voltage VREF2 to the reference voltage line VRL during the second scan period SS. The second reference voltage VREF2 may have a higher voltage level than the first reference voltage VREF1. For example, the first reference voltage VREF1 may be 4.6V, and the second reference voltage VREF2 may be 5V to 7V, but embodiments may not be limited thereto.

According to an embodiment, the bias voltage Vbias may be the reference voltage VREF and the terms reference voltage VREF and bias voltage Vbias may be used interchangeably. For example, the first terminal of the ninth transistor T9 may be electrically connected to the reference voltage line VRL and as shown in FIG. 8, may receive the first reference voltage VREF1 from the reference voltage line VRL during the first scan period AS, and may receive the second reference voltage VREF2 from the reference voltage line VRL during the second scan period SS.

Referring to FIG. 6, the first scan period AS may include a period in which a data signal corresponding to an image is written. The first scan period AS may include a period in which the fourth gate signal EM may be a gate-off voltage and a period in which the fourth gate signal EM may be a gate-on voltage. The period in which the fourth gate signal EM may be a gate-off voltage may be a non-emission period, and the period in which the fourth gate signal EM may be a gate-on voltage may be an emission period. The non-emission period may include at least one initialization period and at least one compensation period. The first scan period AS may include first, second, third, fourth, fifth, and sixth periods P1, P2, P3, P4, P5, and P6.

The first period P1 and the third period P3 may be initialization periods for initializing the first node N1 to which the gate of the first transistor T1 may be electrically connected.

During the first period P1 and the third period P3, the second gate signal GI of a gate-on voltage (second level voltage) may be supplied to the second gate line GIL. The first gate signal GW, the third gate signal GC, the fourth gate signal EM, and the fifth gate signal GB each having the gate-off voltage (first level voltage) may be supplied to the first gate line GWL, the third gate line GCL, the fourth gate line EML, and the fifth gate line GBL, respectively. The fourth transistor T4 may be turned on by the second gate signal GI, and the gate of the first transistor T1 may be initialized with the first initializing voltage VINT.

The second period P2 and the fourth period P4 may be compensation periods for compensating for the threshold voltage of the first transistor T1.

During the second period P2 and the fourth period P4, the third gate signal GC of a gate-on voltage may be supplied to the third gate line GCL, and the fifth gate signal GB of a gate-on voltage may be supplied to the fifth gate line GBL. The first gate signal GW, the second gate signal GI, and the fourth gate signal EM each having the gate-off voltage may be supplied to the first gate line GWL, the second gate line GIL, and the fourth gate line EML, respectively. The third transistor T3 and the fifth transistor T5 may be turned on by the third gate signal GC, and the eighth transistor T8 and the ninth transistor T9 may be turned on by the fifth gate signal GB.

The first reference voltage VREF1 may be supplied as the bias voltage Vbias to the second node N2 by the turned-on ninth transistor T9, and first reference voltage VREF1 may also be supplied to the fourth node N4 by the turned-on fifth transistor T5. A difference (VREF1-Vth) between the first reference voltage VREF1 and a threshold voltage (Vth) of the first transistor T1 may be supplied to the gate of the first transistor T1 in a diode-connected state by the turned-on third transistor T3. The second capacitor C2 may be charged with a voltage corresponding to the threshold voltage (Vth) of the first transistor T1. In other words, the pixel PX may compensate for the threshold voltage of the first transistor T1 by using the first reference voltage VREF1 of a constant voltage.

The pixel electrode of the organic light-emitting diode OLED may be initialized with the second initializing voltage AINT by the turned-on eighth transistor T8. Thus, the second period P2 and the fourth period P4 may be periods for initializing the pixel electrode of the organic light-emitting diode OLED.

As initialization and threshold voltage compensation may be alternately repeated during the first through fourth periods P1 through P4, an on bias voltage may be applied to the first transistor T1 a number of times (e.g., predetermined or selectable number of times) to shift the threshold voltage of the first transistor T1 in a certain direction, thereby compensating for hysteresis. The on bias voltage may be a voltage difference between the gate and source (first terminal) of the first transistor T1 that turns on the first transistor T1. The initialization and the threshold voltage compensation may be alternately repeated multiple times. FIG. 6 illustrates an example in which initialization and threshold voltage compensation may be alternately repeated twice. According to an embodiment, initialization and threshold voltage compensation may each occur once.

The fifth period P5 may be a writing period (data programming period) during which a data signal may be applied to the pixel PX. During the fifth period P5, a voltage corresponding to the data signal may be stored in the gate of a driving transistor (i.e., first transistor T1).

During the fifth period P5, the first gate signal GW of a gate-on voltage may be supplied to the first gate line GWL. The second gate signal GI, the third gate signal GC, the fourth gate signal EM, and the fifth gate signal GB each having the gate-off voltage may be supplied to the second gate line GIL, the third gate line GCL, the fourth gate line EML, and the fifth gate line GBL, respectively.

The second transistor T2 may be turned on by the first gate signal GW. The turned-on second transistor T2 may transmit the data signal DATA received from the data line DL to the fourth node N4. Accordingly, the voltage of the fourth node N4 may change by a voltage corresponding to a difference between the first reference voltage VREF1 and the data signal DATA, and the voltage of the first node N1 may be changed in correspondence with a variation in the voltage of the fourth node N4. Thus, the second capacitor C2 may be charged with a data voltage corresponding to the threshold voltage (Vth) of the first transistor T1 and the data signal DATA.

The sixth period P6 may be an emission period in which the organic light-emitting diode OLED emits light.

During the sixth period P6, the fourth gate signal EM of a gate-on voltage may be supplied to the fourth gate line EML. The first gate signal GW, the second gate signal GI, the third gate signal GC, and the fifth gate signal GB each having the gate-off voltage may be supplied to the first gate line GWL, the second gate line GIL, the third gate line GCL, and the fifth gate line GBL, respectively. The sixth transistor T6 and the seventh transistor T7 may be turned on by the fourth gate signal EM.

A current path from the driving voltage line VDL to the organic light-emitting diode OLED may be formed by the turned-on sixth transistor T6 and the turned-on seventh transistor T7. The first transistor T1 may output a driving current with a magnitude corresponding to a data voltage stored in the second capacitor C2, and the organic light-emitting diode OLED may emit light with a brightness corresponding to the magnitude of the driving current that may be independent of the threshold voltage (Vth) of the first transistor T1.

Referring to FIG. 7, the second scan period SS may include a period in which the fourth gate signal EM may be a gate-off voltage and a period in which the fourth gate signal EM may be a gate-on voltage. The period in which the fourth gate signal EM may be a gate-off voltage may be a non-emission period, and the period in which the fourth gate signal EM may be a gate-on voltage may be an emission period. In order to maintain the luminance of an image output in the first scan period AS, the second scan period SS may include a period in which the bias voltage Vbias may be supplied to the first terminal of the first transistor T1 during the non-emission period. The second scan period SS may include the seventh period P7 and the eighth period P8.

The seventh period P7 may be a compensation period in which voltage-current characteristics of the first transistor T1 may be compensated for. During the seventh period P7, the fifth gate signal GB of a gate-on voltage may be supplied to the fifth gate line GBL. The first gate signal GW, the second gate signal GI, the third gate signal GC, and the fourth gate signal EM each having the gate-off voltage may be supplied to the first gate line GWL, the second gate line GIL, the third gate line GCL, and the fourth gate line EML, respectively. The eighth transistor T8 and the ninth transistor T9 may be turned on by the fifth gate signal GB.

The second reference voltage (VREF2) may be supplied as a bias voltage Vbias to the first terminal of the first transistor T1 by the turned-on ninth transistor T9 so that the gate-source voltage (Vgs) of the first transistor T1 may be controlled, and thus a change in the voltage-current characteristics of the first transistor T1 due to stress applied to the first transistor T1 during the first scan period AS may be compensated for. Accordingly, the pixel PX may maintain the luminance of the image output in the first scan period AS in a subsequent eighth period P8.

The pixel electrode of the organic light-emitting diode OLED may be initialized with the second initializing voltage AINT by the turned-on eighth transistor T8. Thus, the seventh period P7 may be a period for initializing the pixel electrode of the organic light-emitting diode OLED.

The eighth period P8 may be an emission period in which the organic light-emitting diode OLED emits light.

During the eighth period P8, the fourth gate signal EM of a gate-on voltage may be supplied to the fourth gate line EML. The first gate signal GW, the second gate signal GI, the third gate signal GC, and the fifth gate signal GB each having the gate-off voltage may be supplied to the first gate line GWL, the second gate line GIL, the third gate line GCL, and the fifth gate line GBL, respectively. The sixth transistor T6 and the seventh transistor T7 may be turned on by the fourth gate signal EM.

A current path from the driving voltage line VDL to the organic light-emitting diode OLED may be formed by the turned-on sixth transistor T6 and the turned-on seventh transistor T7. The first transistor T1 may output a driving current with a magnitude corresponding to the data voltage stored in the second capacitor C2, and the organic light-emitting diode OLED may emit light with a brightness corresponding to the magnitude of the driving current.

As shown in FIGS. 6 and 8, during the first scan period AS, the fifth gate signal GB may be supplied to the pixel PX at the same time as the third gate signal GC, so that the first reference voltage VREF1 as the bias voltage Vbias may be supplied to the first terminal of the first transistor T1.

As shown in FIGS. 7 and 8, during the second scan period SS, the fifth gate signal GB may be supplied to the pixel PX prior to the eighth period P8, so that the second reference voltage VREF2 as the bias voltage Vbias may be supplied to the first terminal of the first transistor T1.

A signal being supplied may refer to a gate-on voltage of the signal being supplied. A signal not being supplied may refer to a gate-off voltage of the signal being supplied.

Figure 9:
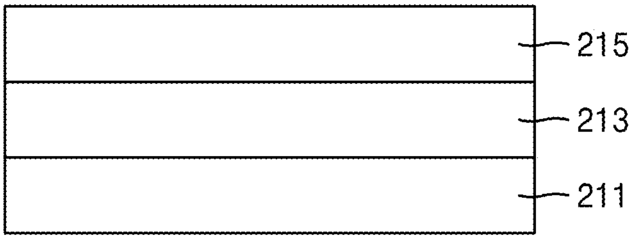
FIG. 9 is a schematic cross-sectional view of a structure of a display element according to an embodiment.

FIG. 9 is a schematic cross-sectional view of a structure of a display element according to an embodiment. FIGS. 10A through 11B are schematic cross-sectional views of structures of a display element according to an embodiment.

Referring to FIG. 9, the organic light-emitting diode OLED as a display element according to an embodiment may include a pixel electrode 211, an opposite electrode 215, and an intermediate layer 213 between the pixel electrode 211 (first electrode, or anode) and the opposite electrode 215 (second electrode, or cathode).

The pixel electrode 211 may include light-transmissive conductive oxide such as indium tin oxide (ITO), indium zinc oxide (IZO), zinc oxide (ZnO), indium oxide ($In_2O_3$), indium gallium oxide (IGO), or aluminum zinc oxide (AZO). The pixel electrode 211 may include a reflective layer including silver (Ag), magnesium (Mg), aluminum (Al), platinum (Pt), palladium (Pd), gold (Au), nickel (Ni), neodymium (Nd), iridium (Ir), chromium (Cr), or a compound of these materials. For example, the pixel electrode 211 may have a multi-layered structure of ITO/Ag/ITO.

The opposite electrode 215 may be disposed on the intermediate layer 213. The opposite electrode 215 may include a metal, an alloy, an electrically conductive compound each having a low work function, or an arbitrary combination thereof. For example, the opposite electrode 215 may include lithium (Li), silver (Ag), magnesium (Mg), aluminum (Al), aluminum-lithium (Al—Li), calcium (Ca), magnesium-indium (Mg—In), magnesium-silver (Mg—Ag), ytterbium (Yb), silver-ytterbium (Ag—Yb), ITO, IZO, or any combination thereof. The opposite electrode 215 may be a transmissive electrode, a semi-transmissive electrode, or a reflective electrode.

The intermediate layer 213 may include a low molecular or high molecular organic material that emits light of a certain color. In addition to various organic materials, the intermediate layer 213 may further include a metal-containing compound (such as, an organic metal compound), an inorganic material (such as, quantum dots), and the like.

According to an embodiment, the intermediate layer 213 may include an emission layer and a first functional layer and a second functional layer respectively below and above the emission layer. The first functional layer may include a hole transport layer (HTL), or may include an HTL and a hole injection layer (HIL). The second functional layer may include an electron transport layer (ETL) and/or an electron injection layer (EIL). The first functional layer or the second functional layer may be omitted. The first functional layer and the second functional layer may be integrally formed to correspond to multiple organic light-emitting diodes OLED included in the display area DA.

According to an embodiment, the intermediate layer 213 may include two or more emitting parts sequentially stacked on each other between the pixel electrode 211 and the opposite electrode 215, and a charge generation layer CGL disposed between two emitting parts. In case that the intermediate layer 213 includes an emitting part and a charge generation layer, the organic light-emitting diode OLED may be a tandem light-emitting diode. The organic light-emitting diode OLED may improve color purity and luminous efficiency by having a stacked structure of multiple emitting parts.

An emitting part may include an emission layer and a first functional layer and a second functional layer respectively below and above the emission layer. The charge generation layer CGL may include a negative charge generation layer and a positive charge generation layer. The luminous efficiency of the organic light-emitting diode OLED, which may be a tandem light-emitting device including multiple emission layers, may be further increased by the negative charge generation layer and the positive charge generation layer.

The negative charge generation layer may be an n-type charge generation layer. The negative charge generation layer may supply electrons. The negative charge generation layer may include a host and a dopant. The host may include an organic material. The dopant may include a metal material. The positive charge generation layer may be a p-type charge generation layer. The positive charge generation layer may supply holes. The positive charge generation layer may include a host and a dopant. The host may include an organic material. The dopant may include a metal material.

Figure 10A:
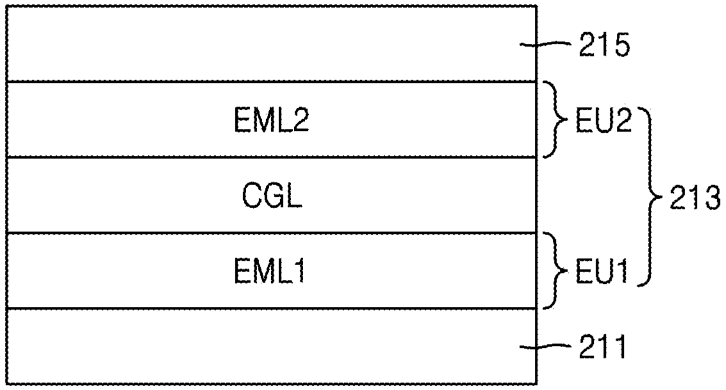
FIGS. 10A, 10B, 10C, and 10D and FIGS. 11A and 11B are schematic cross-sectional views of structures of a display element according to an embodiment.

According to an embodiment, as shown in FIG. 10A, the organic light-emitting diode OLED may include a first emitting part EU1 including a first emission layer EML1 and a second emitting part EU2 including a second emission layer EML2 sequentially stacked on each other. The charge generation layer CGL may be disposed between the first emitting part EU1 and the second emitting part EU2. For example, the organic light-emitting diode OLED may include the pixel electrode 211, the first emission layer EML1, the charge generation layer CGL, the second emission layer EML2, and the opposite electrode 215 sequentially stacked on each other. The first functional layer and the second functional layer may be provided below and above the first emission layer EML1, respectively. The first functional layer and the second functional layer may be provided below and above the second emission layer EML2, respectively. The first emission layer EML1 may be a blue emission layer, and the second emission layer EML2 may be a yellow emission layer.

Figure 10B:
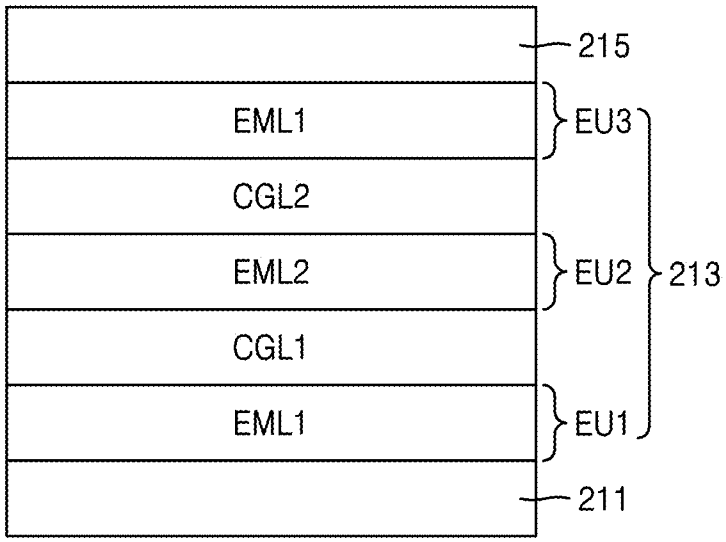

According to an embodiment, as shown in FIG. 10B, the organic light-emitting diode OLED may include a first emitting part EU1 and a third emitting part EU3 each including a first emission layer EML1 and a second emission part EU2 including a second emission layer EML2. A first charge generation layer CGL1 may be provided between the first emitting part EU1 and the second emitting part EU2, and a second charge generation layer CGL2 may be provided between the second emitting part EU2 and the third emitting part EU3. For example, the organic light-emitting diode OLED may include the pixel electrode 211, the first emission layer EML1, the first charge generation layer CGL1, the second emission layer EML2, the second charge generation layer CGL2, the first emission layer EML1, and the opposite electrode 215 sequentially stacked on each other. The first functional layer and the second functional layer may be provided below and above the first emission layer EML1, respectively. The first functional layer and the second functional layer may be provided below and above the second emission layer EML2, respectively. The first emission layer EML1 may be a blue emission layer, and the second emission layer EML2 may be a yellow emission layer.

According to an embodiment, in the organic light-emitting diode OLED, the second emitting part EU2 may further include a third emission layer EML3 and/or a fourth emission layer EML4 disposed below and/or above the second emission layer EML2 in direct contact with the second emission layer EML2, in addition to the second emission layer EML2. The direct contact may refer to no other layers being disposed between the second emission layer EML2 and the third emission layer EML3 and/or between the second emission layer EML2 and the fourth emission layer EML4. The third emission layer EML3 may be a red emission layer, and the fourth emission layer EML4 may be a green emission layer.

Figure 10C:
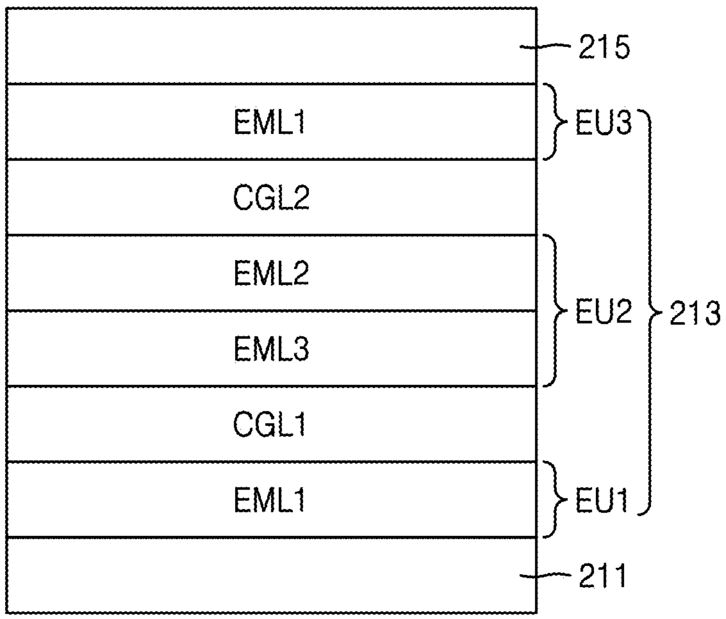
Figure 10D:
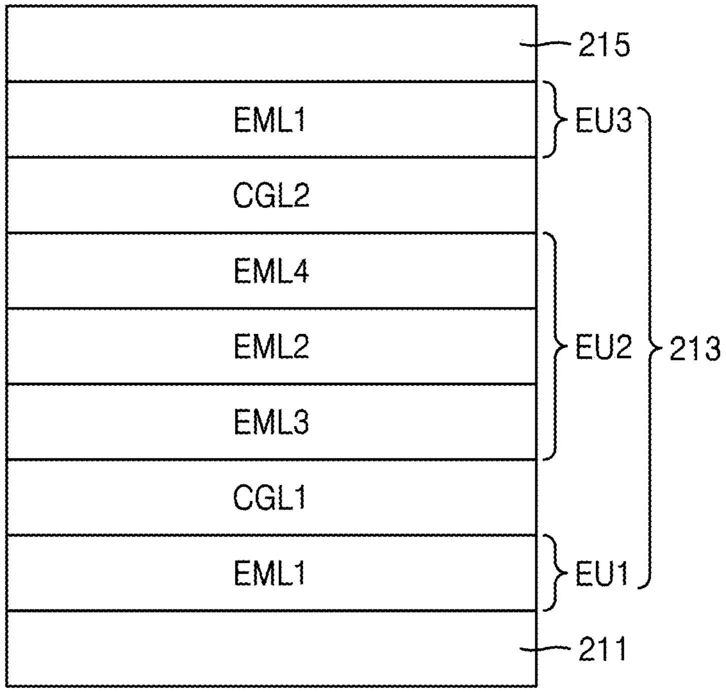

For example, as shown in FIG. 10C, the organic light-emitting diode OLED may include the pixel electrode 211, the first emission layer EML1, the first charge generation layer CGL1, the third emission layer EML3, the second emission layer EML2, the second charge generation layer CGL2, the first emission layer EML1, and the opposite electrode 215 sequentially stacked on each other. As shown in FIG. 10D, the organic light-emitting diode OLED may include the pixel electrode 211, the first emission layer EML1, the first charge generation layer CGL1, the third emission layer EML3, the second emission layer EML2, a fourth emission layer EML4, the second charge generation layer CGL2, the first emission layer EML1, and the opposite electrode 215 sequentially stacked on each other.

Figure 11A:
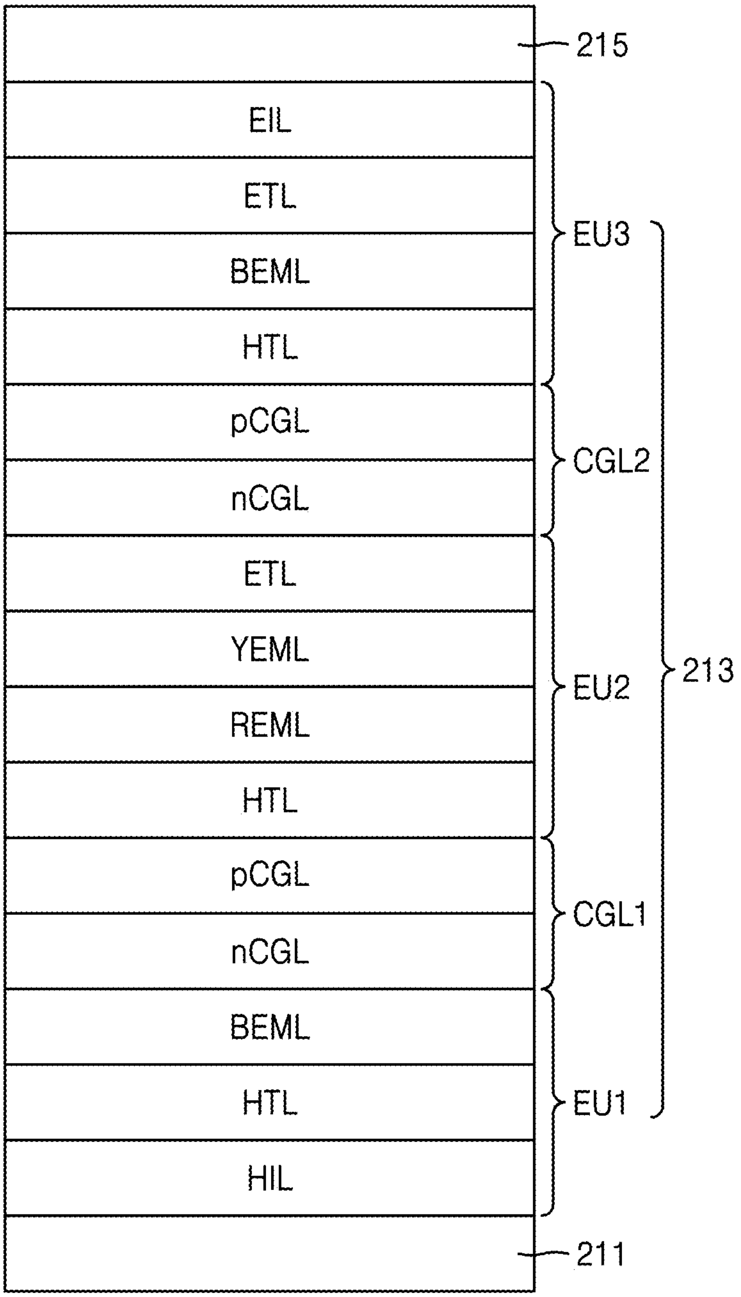
Figure 11B:
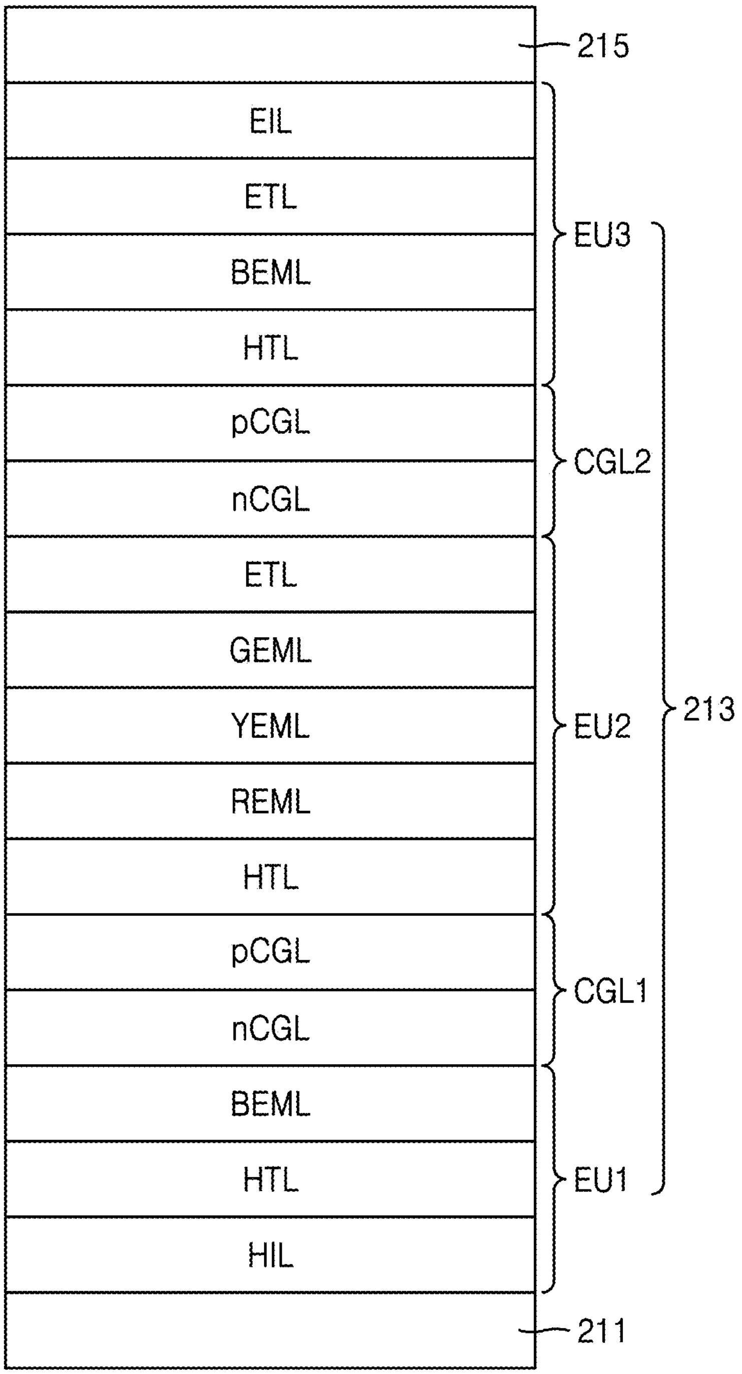

FIG. 11A is a schematic cross-sectional view showing an example of the organic light-emitting diode OLED of FIG. 10C, and FIG. 11B is a schematic cross-sectional view showing an example of the organic light-emitting diode OLED of FIG. 10D.

Referring to FIG. 11A, the organic light-emitting diode OLED may include a first emitting part EU1, a second emitting part EU2, and a third emitting part EU3 sequentially stacked on each other. A first charge generation layer CGL1 may be provided between the first emitting part EU1 and the second emitting part EU2, and a second charge generation layer CGL2 may be provided between the second emitting part EU2 and the third emitting part EU3. Each of the first charge generation layer CGL1 and the second charge generation layer CGL2 may include a negative charge generation layer nCGL and a positive charge generation layer pCGL.

The first emitting part EU1 may include a blue emission layer BEML. The first emitting part EU1 may further include an HIL and an HTL between the pixel electrode 211 and the blue emission layer BEML. According to an embodiment, a p-doped layer may be further included between the HIL and the HTL. The p-doped layer may be formed by doping the HIL with a p-type doping material. According to an embodiment, at least one of a blue light auxiliary layer, an electron stop layer, and a buffer layer may be further included between the blue emission layer BEML and the HTL. The blue light auxiliary layer may increase light emission efficiency of the blue emission layer BEML. The blue light auxiliary layer may increase light emission efficiency of the blue emission layer BEML by adjusting a hole charge balance. The electron stop layer may prevent injection of electrons into the HTL. The buffer layer may compensate for a resonance distance according to the wavelength of light emitted by the emission layer.

The second emitting part EU2 may include a yellow emission layer YEML and a red emission layer REML contacting (e.g., directly contacting) the yellow emission layer YEML below the yellow emission layer YEML. The second emitting part EU2 may further include an HTL between the positive charge generating layer pCGL of the first charge generating layer CGL1 and the red emission layer REML, and may further include an ETL between the yellow emission layer YEML and the negative charge generation layer nCGL of the second charge generating layer CGL2.

The third emitting part EU3 may include a blue emission layer BEML. The third emitting part EU3 may further include an HTL between the positive charge generating layer pCGL of the second charge generating layer CGL2 and the blue emission layer BEML. The third emitting part EU3 may further include an ETL and an EIL between the blue emission layer BEML and the opposite electrode 215. The ETL may be a single layer or multiple layers. According to an embodiment, at least one of a blue light auxiliary layer, an electron stop layer, and a buffer layer may be further included between the blue emission layer BEML and the HTL. At least one of a hole stop layer and a buffer layer may be further included between the blue emission layer BEML and the ETL. The hole stop layer may prevent injection of holes into the ETL.

The organic light-emitting diode OLED shown in FIG. 11B may be the same as the organic light-emitting diode OLED shown in FIG. 11A except for the stacked structure of the second emitting part EU2. Referring to FIG. 11B, the second emitting part EU2 may include a yellow emission layer YEML, a red emission layer REML contacting (e.g., directly contacting) the yellow emission layer YEML below the yellow emission layer YEML, and a green emission layer GEML contacting (e.g., directly contacting) the yellow emission layer YEML above the yellow emission layer YEML. The second emitting part EU2 may further include an HTL between the positive charge generating layer pCGL of the first charge generating layer CGL1 and the red emission layer REML, and may further include an ETL between the green emission layer GEML and the negative charge generation layer nCGL of the second charge generating layer CGL2.

Figure 12:
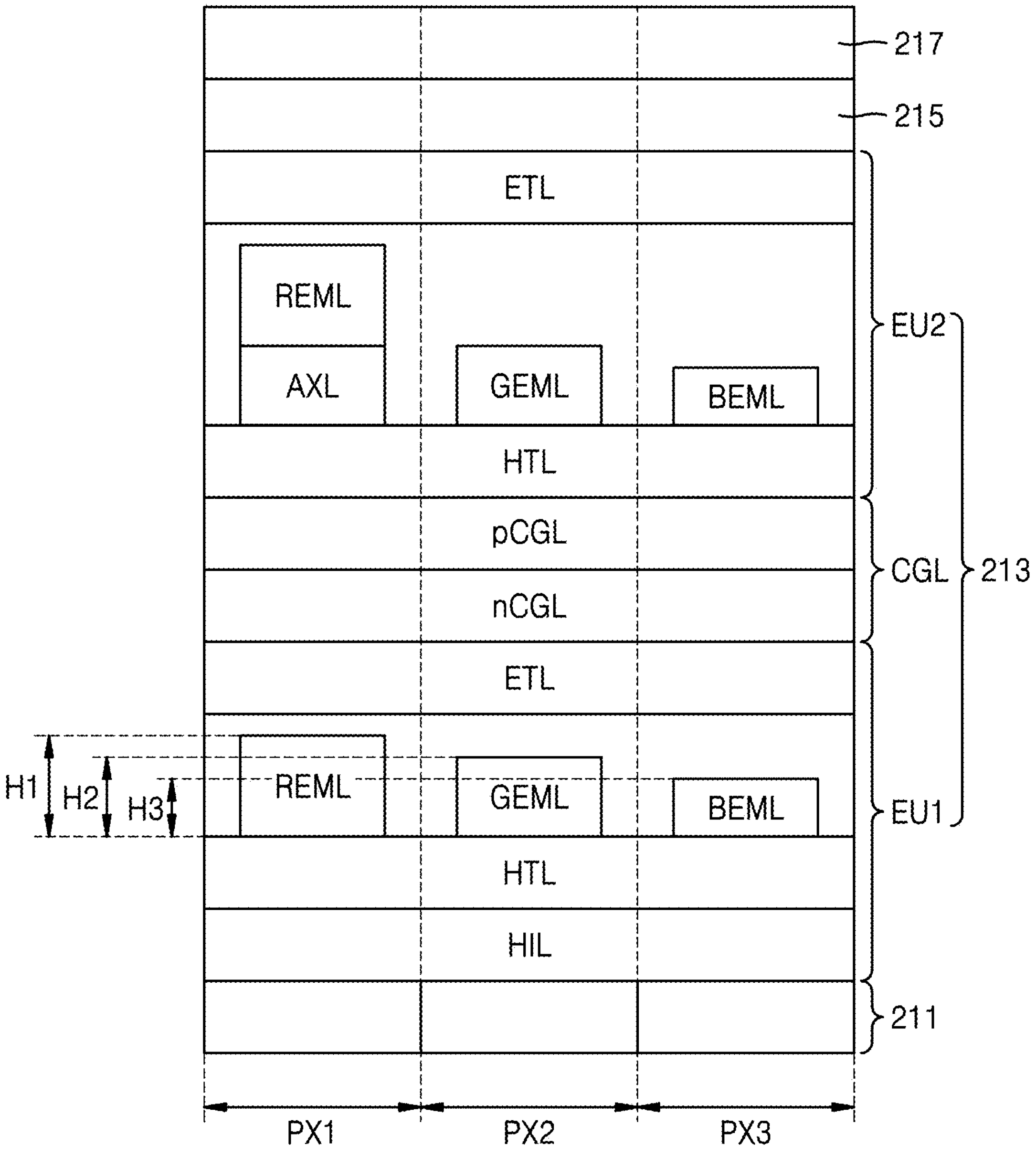
FIG. 12 is a schematic cross-sectional view of a structure of a pixel of a display apparatus according to an embodiment.

FIG. 12 is a schematic cross-sectional view of a structure of a pixel of a display apparatus according to an embodiment.

Referring to FIG. 12, the display apparatus may include multiple pixels. The pixels may include a first pixel PX1, a second pixel PX2, and a third pixel PX3. Each of the first pixel PX1, the second pixel PX2, and the third pixel PX3 may include a pixel electrode 211, an opposite electrode 215, and an intermediate layer 213. According to an embodiment, the first pixel PX1 may be a red pixel, the second pixel PX2 may be a green pixel, and the third pixel PX3 may be a blue pixel. Each pixel may include an organic light-emitting diode OLED as a display element, and the organic light-emitting diode OLED of each pixel may be electrically connected to a pixel circuit.

The pixel electrodes 211 may be independently included in the first pixel PX1, the second pixel PX2, and the third pixel PX3.

The intermediate layer 213 of the organic light-emitting diode OLED of each of the first pixel PX1, the second pixel PX2, and the third pixel PX3 may include the first emitting part EU1 and the second emitting part EU2 sequentially stacked on each other, and the charge generation layer CGL between the first emitting part EU1 and the second emitting part EU2. The charge generation layer may include a negative charge generation layer nCGL and a positive charge generation layer pCGL. The charge generation layer CGL may be a common layer continuously formed in the first pixel PX1, the second pixel PX2, and the third pixel PX3.

The first emitting part EU1 of the first pixel PX1 may include a hole injection layer HIL, a hole transport layer HTL, a red emission layer REML, and an electron transport layer ETL sequentially stacked on each other on the pixel electrode 211. The first emitting part EU1 of the second pixel PX2 may include a hole injection layer HIL, a hole transport layer HTL, a green emission layer GEML, and an electron transport layer ETL sequentially stacked on each other on the pixel electrode 211. The first emitting part EU1 of the third pixel PX3 may include a hole injection layer HIL, a hole transport layer HTL, a blue emission layer BEML, and an electron transport layer ETL sequentially stacked on each other on the pixel electrode 211. Each of the hole injection layer HIL, the hole transport layer HTL, and the electron transport layer ETL of the first emitting part EU1 may be a common layer continuously formed in the first pixel PX1, the second pixel PX2, and the third pixel PX3.

The second emitting part EU2 of the first pixel PX1 may include a hole transport layer HTL, an auxiliary layer AXL, a red emission layer REML, and an electron transport layer ETL sequentially stacked on each other on the charge generation layer CGL. The second emitting part EU2 of the second pixel PX2 may include a hole transport layer HTL, a green emission layer GEML, and an electron transport layer ETL sequentially stacked on each other on the charge generation layer CGL. The second emitting part EU2 of the third pixel PX3 may include a hole transport layer HTL, a blue emission layer BEML, and an electron transport layer ETL sequentially stacked on each other on the charge generation layer CGL. Each of the hole transport layer HTL and the electron transport layer ETL of the second emitting part EU1 may be a common layer continuously formed in the first pixel PX1, the second pixel PX2, and the third pixel PX3. According to an embodiment, at least one of a hole stop layer and a buffer layer may be included between the emission layer and the electron transport layer ETL in the second emitting part EU2 of the first pixel PX1, the second pixel PX2, and the third pixel PX3.

A thickness H1 of the red emission layer REML, a thickness H2 of the green emission layer GEML, and a thickness H3 of the blue emission layer BEML may be determined according to a resonance distance. The auxiliary layer AXL may be a layer added to adjust the resonance distance, and may include a resonance auxiliary material. For example, the auxiliary layer AXL and the hole transport layer HTL may include a same material.

In FIG. 12, only the first pixel PX1 includes the auxiliary layer AXL. However, embodiments may not be limited thereto. For example, the auxiliary layer AXL may be included in at least one of the first pixel PX1, the second pixel PX2, and the third pixel PX3 in order to adjust the resonance distances of at least one of the first pixel PX1, the second pixel PX2, and the third pixel PX3.

The display apparatus may further include a capping layer 217 disposed outside the opposite electrode 215. The capping layer 217 may serve to improve luminescent efficiency according to the principle of constructive interference. Accordingly, the light extraction efficiency of the organic light-emitting diode OLED may be increased, and thus the luminescent efficiency of the organic light-emitting diode OLED may be improved.

According to embodiments, a display apparatus capable of improving a display quality may be provided. Of course, the scope of the disclosure may not be limited thereto.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A pixel comprising:

a light-emitting device;

a first transistor electrically connected between a first voltage line and the light-emitting device and configured to control a current supplied to the light-emitting device;

a second transistor electrically connected between a first node electrically connected to a gate of the first transistor and a second node electrically connected to a first terminal of the first transistor;

a third transistor electrically connected between the first voltage line and a third node electrically connected to a second terminal of the first transistor;

a fourth transistor electrically connected between the second node and the light-emitting device; and a fifth transistor configured to supply a bias voltage to the third node, wherein a gate driving circuit is configured to supply a gate-on voltage of a first level to a gate of the fifth transistor during at least a portion of a period during which the gate driving circuit supplies a gate-off voltage of a second level to a gate of the third transistor and a gate of the fourth transistor, wherein a frame includes a first scan period during which a data driving circuit is configured to supply a data signal and the light-emitting device is configured to emit light with a brightness corresponding to the data signal, and wherein the gate driving circuit is configured to supply the gate-on voltage to a gate of the second transistor and to the gate of the fifth transistor such that an on and off pattern of the second transistor is the same as an on and off pattern of the fifth transistor during the first scan period.

2. The pixel of claim 1, wherein the frame includes a second scan period during which the data signal supplied during the first scan period is maintained and light is emitted with the brightness corresponding to the data signal, and the fifth transistor is configured to supply a first bias voltage to the third node in response to the gate-on voltage being supplied to the gate of the fifth transistor during the first scan period, and supply a second bias voltage to the third node in response to the gate-on voltage being supplied to the gate of the fifth transistor during the second scan period.

3. The pixel of claim 2, wherein the second bias voltage is higher than the first bias voltage.

4. The pixel of claim 2, wherein the first scan period includes a first period during which the gate driving circuit is configured to supply the gate-on voltage to each of the gate of the second transistor and the gate of the fifth transistor within the period during which the gate driving circuit supplies the gate-off voltage of the second level to the gate of the third transistor and the gate of the fourth transistor, and the second scan period includes a second period during which the gate driving circuit is configured to supply the gate-off voltage to the gate of the second transistor and supply the gate-on voltage to the gate of the fifth transistor within the period during which the gate driving circuit supplies the gate-off voltage of the second level to the gate of the third transistor and the gate of the fourth transistor.

5. The pixel of claim 4, wherein the gate of the third transistor and the gate of the fourth transistor are electrically connected to a first gate line, and the gate of the fifth transistor is electrically connected to a second gate line.

6. The pixel of claim 5, further comprising:

a sixth transistor electrically connected between a pixel electrode of the light-emitting device and a second voltage line, and wherein a gate of the sixth transistor is electrically connected to the second gate line.

7. The pixel of claim 6, further comprising:

a first capacitor electrically connected between the first voltage line and a fourth node;

a second capacitor electrically connected between the fourth node and the first node;

a seventh transistor electrically connected between a data line and the fourth node;

an eighth transistor electrically connected between the fourth node and a third voltage line; and a ninth transistor electrically connected between the first node and a fourth voltage line.

8. The pixel of claim 7, wherein the fifth transistor is electrically connected between the third node and the third voltage line.

9. The pixel of claim 8, wherein a gate of the seventh transistor is electrically connected to a third gate line, the gate of the second transistor and a gate of the eighth transistor are electrically connected to a fourth gate line, and a gate of the ninth transistor is electrically connected to a fifth gate line.

10. A display apparatus comprising:

a plurality of pixels; and a gate driving circuit configured to supply a plurality of gate signals to the plurality of pixels, wherein each of the plurality of pixels comprises:

a light-emitting device;

a first transistor electrically connected between a first voltage line and the light-emitting device and configured to control a current supplied to the light-emitting device;

a second transistor electrically connected between a first node electrically connected to a gate of the first transistor and a second node electrically connected to a first terminal of the first transistor;

a third transistor electrically connected between the first voltage line and a third node electrically connected to a second terminal of the first transistor;

a fourth transistor electrically connected between the second node and the light-emitting device; and a fifth transistor configured to supply a bias voltage to the third node, wherein a gate of the third transistor and a gate of the fourth transistor are electrically connected to a first gate line configured to supply a first gate signal, wherein a gate of the fifth transistor is electrically connected to a second gate line configured to supply a second gate signal, wherein a gate of the second transistor is electrically connected to a third gate line configured to supply a third gate signal, wherein a frame includes a first scan period during which a data driving circuit is configured to supply a data signal and the light-emitting device is configured to emit light with a brightness corresponding to the data signal, and wherein the gate driving circuit is configured to supply a gate-on voltage to the third gate line of the second transistor and to the second gate line of the fifth transistor such that an on and off pattern of the second transistor is the same as an on and off pattern of the fifth transistor during the first scan period.

11. The display apparatus of claim 10, wherein each of the plurality of pixels further comprises:

a first capacitor electrically connected between the first voltage line and a fourth node;

a second capacitor electrically connected between the fourth node and the first node;

a sixth transistor electrically connected between a data line and the fourth node;

a seventh transistor electrically connected between the fourth node and a second voltage line;

an eighth transistor electrically connected between the first node and a third voltage line; and a ninth transistor electrically connected between a pixel electrode of the light-emitting device and a fourth voltage line.

12. The display apparatus of claim 11, wherein the fifth transistor is electrically connected between the third node and the second voltage line.

13. The display apparatus of claim 12, wherein a gate of the ninth transistor is electrically connected to the second gate line, a gate of the seventh transistor is electrically connected to the third gate line, a gate of the sixth transistor is electrically connected to a fourth gate line configured to supply a fourth gate signal, and a gate of the eighth transistor is electrically connected to a fifth gate line configured to supply a fifth gate signal.

14. The display apparatus of claim 13, wherein the fifth transistor is configured to supply a first bias voltage to the third node during the first scan period.

15. The display apparatus of claim 14, wherein the frame further includes at least one second scan period subsequent to the first scan period, wherein, during the at least one second scan period, the data signal supplied during the first scan period is maintained and the light-emitting device is configured to emit light with a brightness corresponding to the data signal, and the fifth transistor is configured to supply a second bias voltage to the third node during the at least one second scan period.

16. The display apparatus of claim 15, wherein the second bias voltage is higher than the first bias voltage.

17. The display apparatus of claim 15, wherein the first scan period and the at least one second scan period include a non-emission period and an emission period, respectively, and the gate driving circuit is configured to supply:

a first gate signal of a gate-off voltage to the first gate line during a non-emission period of each of the first scan period and the at least one second scan period, a second gate signal of a gate-on voltage to the second gate line and a third gate signal of a gate-on voltage to the third gate line during a first period of the non-emission period of the first scan period, and the second gate signal of a gate-on voltage to the second gate line and the third gate signal of a gate-off voltage to the third gate line during a second period of the non-emission period of the at least one second scan period.

18. The display apparatus of claim 17, wherein the gate driving circuit is configured to supply a fourth gate signal of a gate-on voltage to the fourth gate line during a write period between the first period of the first scan period and the emission period of the first scan period.

19. The display apparatus of claim 17, wherein the gate driving circuit is configured to supply a fifth gate signal of a gate-on voltage to the fifth gate line prior to the first period of the non-emission period of the first scan period.

* * * * *